Jan. 24, 1956  J. A. CUTHBERTSON  2,732,265
ENDLESS BAND DEVICES
Filed March 13, 1953  9 Sheets-Sheet 1

Inventor
James Archibald Cuthbertson
By
Richardson, Davis and Morton.
his Attorneys

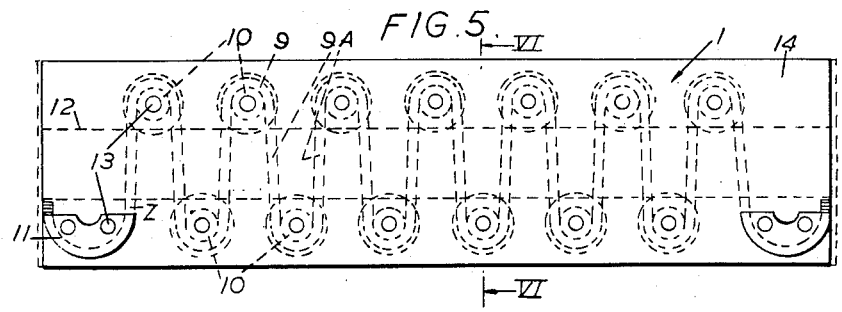
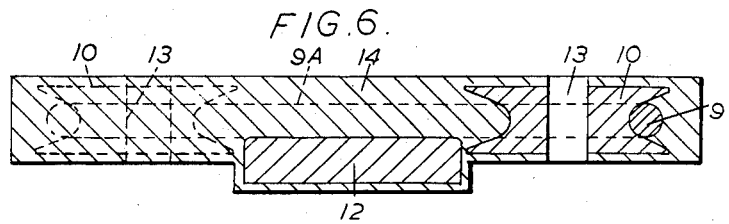
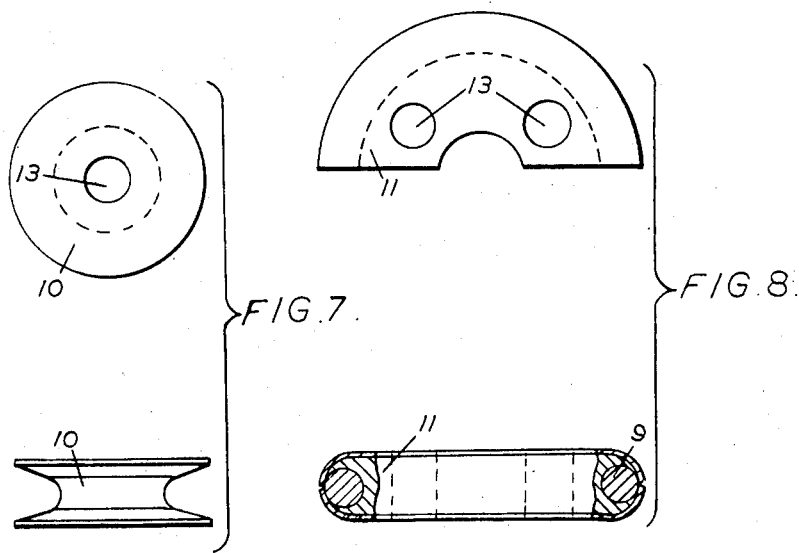

Jan. 24, 1956  J. A. CUTHBERTSON  2,732,265
ENDLESS BAND DEVICES
Filed March 13, 1953  9 Sheets-Sheet 3

*Inventor*
James Archibald Cuthbertson

By
Richardson, Davis and Norton
his *Attorneys.*

Jan. 24, 1956  J. A. CUTHBERTSON  2,732,265
ENDLESS BAND DEVICES
Filed March 13, 1953  9 Sheets—Sheet 4
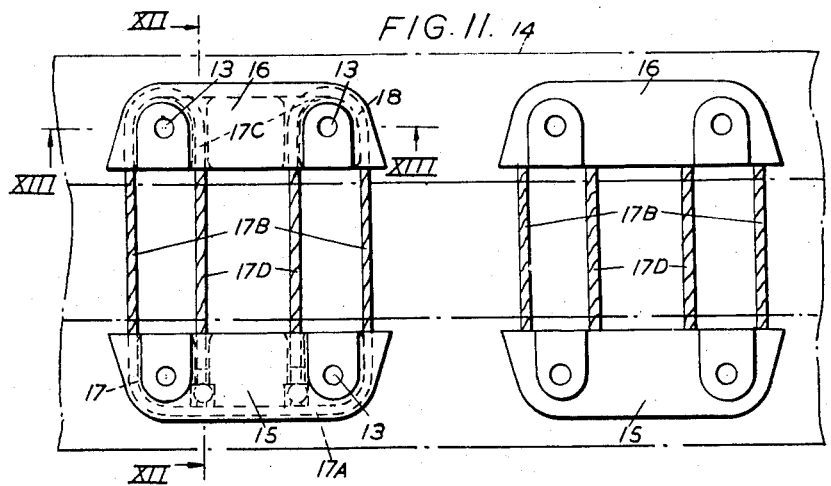
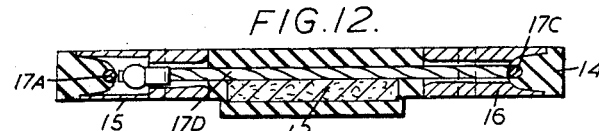
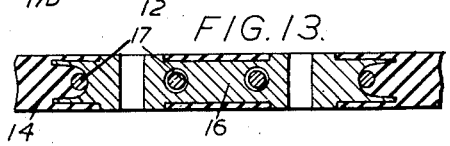
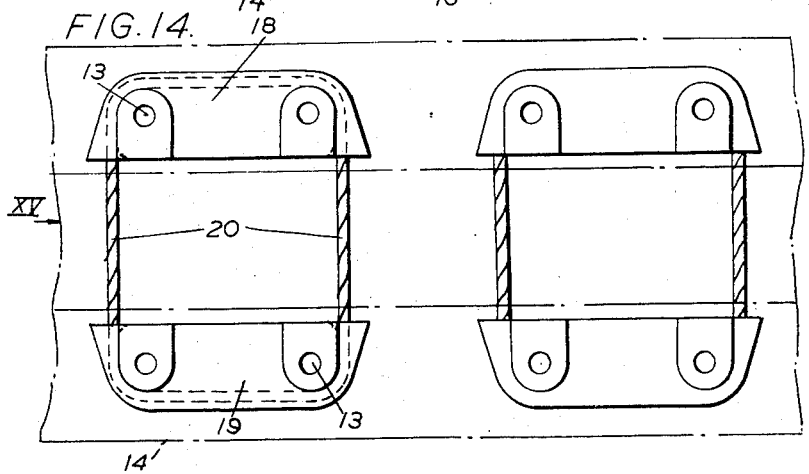
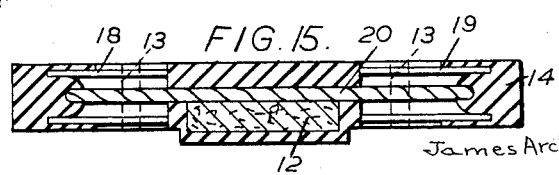
Inventor
James Archibald Cuthbertson
By Richardson, Davis and Worden
his Attorneys Jan. 24, 1956  J. A. CUTHBERTSON  2,732,265
ENDLESS BAND DEVICES
Filed March 13, 1953  9 Sheets-Sheet 5

*Inventor*
James Archibald Cuthbertson

By Richardson, Davis and Norton
*his Attorneys*

Inventor
James Archibald Cuthbertson

By
Richardson, David and Norton
his Attorneys

Jan. 24, 1956  J. A. CUTHBERTSON  2,732,265
ENDLESS BAND DEVICES
Filed March 13, 1953  9 Sheets-Sheet 7

Inventor
James Archibald Cuthbertson
By
his Attorneys.

Jan. 24, 1956 J. A. CUTHBERTSON 2,732,265
ENDLESS BAND DEVICES
Filed March 13, 1953 9 Sheets-Sheet 8

Inventor
James Archibald Cuthbertson

By Richardson, David and Nordon
his Attorneys

Jan. 24, 1956   J. A. CUTHBERTSON   2,732,265
ENDLESS BAND DEVICES
Filed March 13, 1953   9 Sheets-Sheet 9

Inventor
James Archibald Cuthbertson
By
Richardson, David and Norden
his Attorneys United States Patent Office 2,732,265
Patented Jan. 24, 1956

2,732,265

ENDLESS BAND DEVICES

James A. Cuthbertson, Biggar, Scotland

Application March 13, 1953, Serial No. 342,249

Claims priority, application Great Britain March 7, 1949

12 Claims. (Cl. 305—10)

This invention relates to endless band devices and is especially applicable to self-laying endless tracks for tractors and other vehicles, and endless band conveyors.

The present application forms a continuation-in-part of my prior application Serial No. 148,040, filed March 7, 1950, now abandoned.

An object of the invention is to provide an endless track for a vehicle, in which any undue increase in tension at one longitudinal edge of the track is transmitted transversely of the track to avoid excessive loading and consequent breakage at said edge.

A further object of the invention is to provide an endless track in which any undue increase in tension at one longitudinal edge is transmitted directly across the entire width of the track to the other longitudinal edge so that damage to the track due to excessive loading is obviated.

A further object of the invention is to provide an endless band device composed of a series of interconnected flexible units which are easily handled for removal and replacement and in which the metallic parts transmitting the tension are protected against the weather.

Embodiments of the invention will now be described by way of example, with reference to the accompanying drawings in which:

Fig. 5 is a plan view of one form of track unit.

Fig. 6 is a sectional view on the line VI—VI of Fig. 5.

Figs. 7 and 8 are detail views of Fig. 5.

Fig. 11 is a fragmentary plan view of a second form of track unit.

Figs. 12 and 13 are sectional views respectively on the lines XII—XII and XIII—XIII of Fig. 11.

Fig. 14 is a fragmentary plan view of a third form of track unit.

Fig. 15 is a sectional view in the direction of the arrow XV in Fig. 14.

Figure 1:
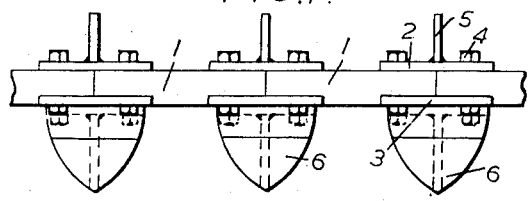
Fig. 1 is a side elevation of a portion of an endless track.
Figure 2:
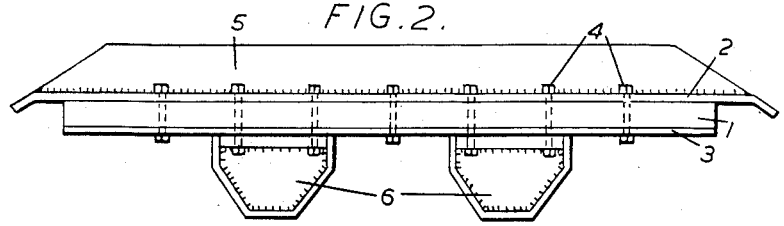
Fig. 2 is an end elevation of the track portion.
Figure 3:
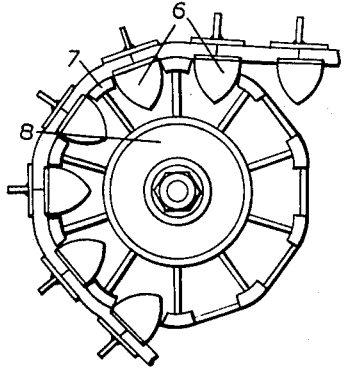
Figs. 3 and 4 are respectively side and front elevations of the track engaging the driving sprocket of a tractor.
Figure 4:
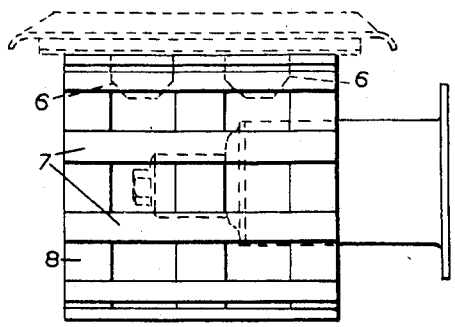
Figure 9:
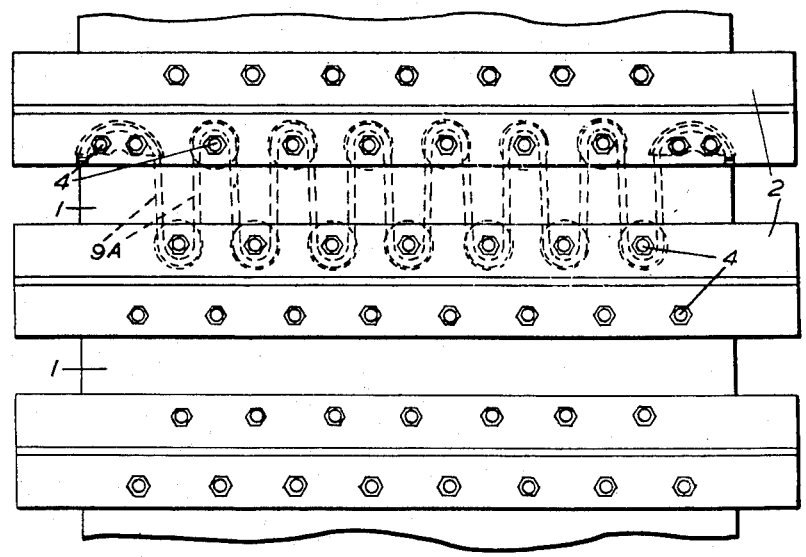
Figs. 9 and 10 are plan views of the outer and inner faces respectively of a track embodying units according to Fig. 5.
Figure 10:
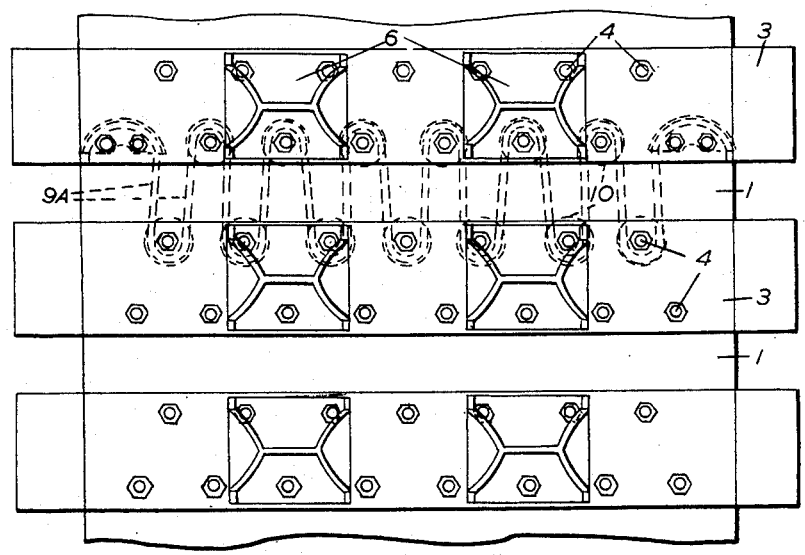

Referring to the drawings:

In Figs. 1 to 4, an endless track for a tractor consists of a series of flexible, abutting units 1 joined to each other by connection means in the form of a pair of outer and inner metal plates 2 and 3 and clamping bolts 4 extending through adjacent units and interconnecting the plates 2 and 3. The plates 2 have thereon outwardly projecting spades 5 for gripping the soil, and each plate 3 has secured thereon by the bolts 4, a pair of teeth 6 which engage the cross members 7 of a driving sprocket 8 on the tractor (not shown).

Figure 16:
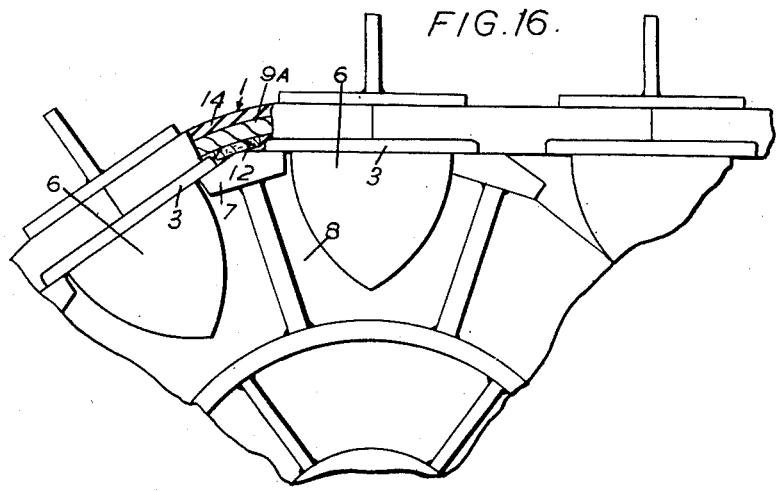
Fig. 16 is a part-sectional view of the track passing around the sprocket wheel.

In Figs. 5 to 10 each track unit 1 comprises a multi-strand wire cable 9 looped sinuously in a transverse direction around series of pulley-wheel guides 10 disposed in two longitudinally spaced transverse series with the guides in each series staggered relative to those in the other series. The loops are formed about the pulley-wheel axes which are normal to the ground when the unit is in contact therewith. The cable 9 thus passes sinuously around all the guides 10 and forms a transverse series of loops which lie in a plane parallel to the ground when the unit is in contact with the ground, and whereof the limbs form transversely spaced flexible stretches 9A between the series of guides. Clamps 11 of D-shape or semicircular shape similar to a half bobbin or half pulley, secure the cable ends, the side walls of said clamps being deformed towards each other in a press so as to grip the cable ends (Fig. 8). A transverse flexible supporting strip 12 of canvas or other semi-stiff material engages the inner side of the flexible stretches 9A which are maintained by the strip against sharp bending on passage of the track around the sprocket 8 (Fig. 16). Thus, breakage of the stretches 9A due to repeated sharp bending is obviated or mitigated. The canvas strip 12 may be omitted and replaced by rubber when the track is to operate under light load. The guides 10 and clamps 11 have bolt openings 13 therethrough to permit interconnection of a series of the units to form a track. The tension member is wholly and permanently enclosed in, and the guide means are permanently embedded in, a block 14 of rubber or rubberlike material, for example, by moulding, to form a flexible, rectangular unit with the openings 13 therethrough. As shown, the top and bottom faces of the guides 10 and clamps 11 may be free of rubber.

The successive units are constructed separately but adjacent units are joined together by passing the bolts 4 through said openings 13 in the guides 10 and clamps 11. The metal plates 2 and 3 joining successive units 1 may leave longitudinal clearance between them of say one and a half inches and flexibility of the track at said units is allowed at this clearance.

The tension in the track is transmitted through the flexible stretches 9A of the cable 9, and any increase of tension in one or more stretches 9A of a unit relative to the tension in the other stretches 9A of the unit, for instance arising from transverse sloping of the track and consequent increase in tension at one longitudinal edge of the track, is distributed around the guides 10 and through said other stretches 9A, so that breakage of the cable 9 due to excessive load is obviated. Also, by enclosing or embedding the metallic parts 9—11 in a unitary manner in rubber, there is formed a flexible track unit which is easily handled for removal and replacement and has its metallic parts protected against the weather.

Referring to Figs. 11 to 13 the guide means consist of transversely spaced pairs of grooved guide members 15 and 16, and wire cables 17 engage in the grooves of and interconnect said members. Each member 15 has around it a single U-loop 17A of the cable 17 which forms an outer pair of flexible stretches 17B. Each member 16 has a spaced pair of guides 18 around which the cable 17 extends to form two U-loops 17C and an inner pair of flexible stretches 17D, the ends of the stretches 17D being anchored to the member 15. The grooves in the guide members 15 and 16 are disposed so that the loops are formed about axes normal to the ground when the unit is in contact therewith. Any increase in tension in, say, adjacent stretches 17B and 17D is distributed around guide 15 to the remaining stretches 17B and 17D. The units are interconnected as previously described in connection with Fig. 1, the clamping bolts passing through holes 13 in the guide members.

Referring to Figs. 14 and 15, each pair of grooved guide members 18 and 19 are engaged in their grooves by an endless flexible cable 20 forming parallel flexible stretches between the members, any increase in tension in one stretch being distributed around the members to the other stretch. As previously, the grooves in the guide members are disposed so that the loops are formed about axes normal to the ground, and the units are interconnected by passing the clamping bolts through the openings 13.

Figure 17:
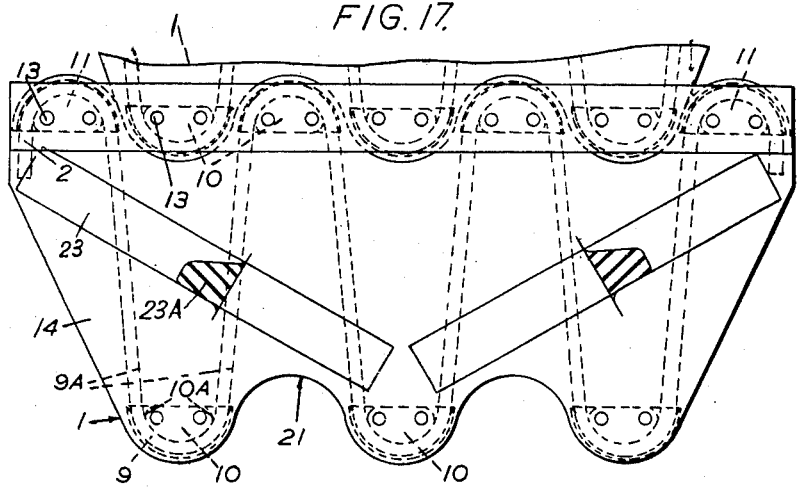
Fig. 17 is a fragmentary plan view of a track embodying a fourth form of unit.
Figure 18:
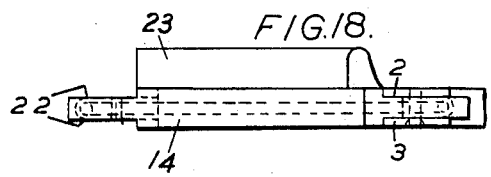
Fig. 18 is a side view of Fig. 17.
Figure 19:
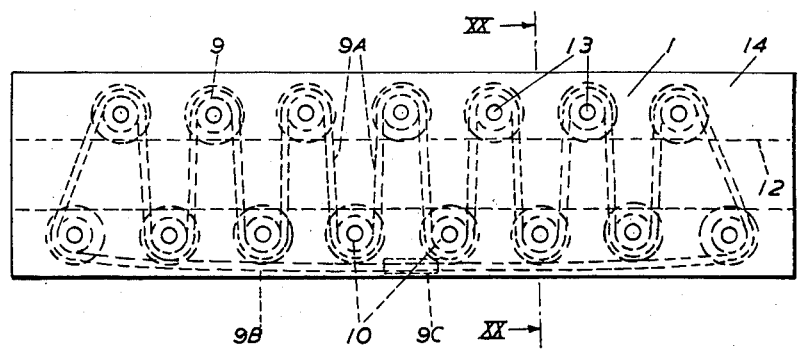
Fig. 19 is a plan view of a modified form of the track unit according to Fig. 5.
Figure 20:
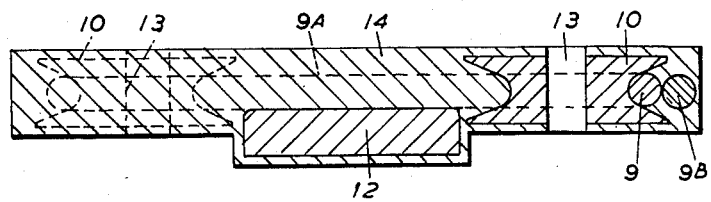
Fig. 20 is a sectional view on the line XX—XX of Fig. 19.

Referring to Figs. 17 and 18, the guides 10 are in the form of fixed half-pulleys with their axes normal to the ground, and are spaced somewhat further apart in each row as compared with Fig. 5, so that the cable 9 extends in a somewhat diagonal but generally longitudinal direction between each guide, and the rubber is moulded and vulcanized so as to present concavities 21 on the leading and trailing edges of the units between adjacent guides 10. The guides 10 of the adjacent track units 1 are adapted to nest in these concavities 21, the concavities in one unit receiving the projecting guides of the other unit and vice versa. The grooves of the half-pulleys have divergent mouths 10 to prevent chafing of the cable.

The rubber moulding 4 on each guide 10 is of reduced height on inner and outer surfaces, thus forming transverse grooves 22 in which the transverse metal joining plates 2 and 3 seat substantially flush, said plates being bolted together by the aforesaid clamping bolts extending through the openings 13 in the guides and clamps. The inner metal plate 3 is provided with projecting lugs or teeth (not shown) adapted to engage the driving sprocket or the like. The track units may be moulded with integral outer rubber treads 23 whose cross section is indicated diagrammatically at 23A. In operation, flexing of the track occurs at each track unit between the rows of guides.

In Figs. 19 to 22, the cable 9 passes sinuously around all the guides 10 and then extends transversely alongside one series of guides, as at 9B, and has its ends joined together at 9C, thereby forming an endless band extending across substantially the entire unit width, the transverse length 9B enabling transmission of tension directly across the unit.

Any increase of tension on one or more stretches 9A of a unit relative to the tension in the other stretches 9A of the unit, for instance arising from transverse sloping of the track and consequent increase in tension at one longitudinal edge of the track, is distributed around the guides 10 and through said other stretches 9A, and is also transmitted directly through the length 9B, so that breakage of the cable 9 due to excessive load is obviated.

Figure 23:
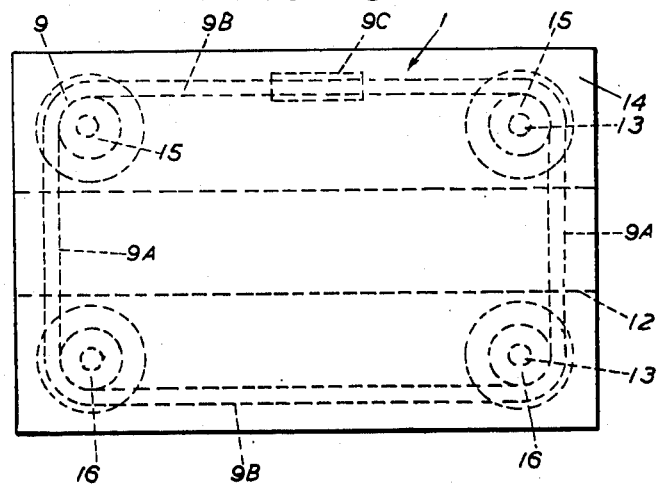
Fig. 23 is a plan view of another form of track unit.
Figure 21:
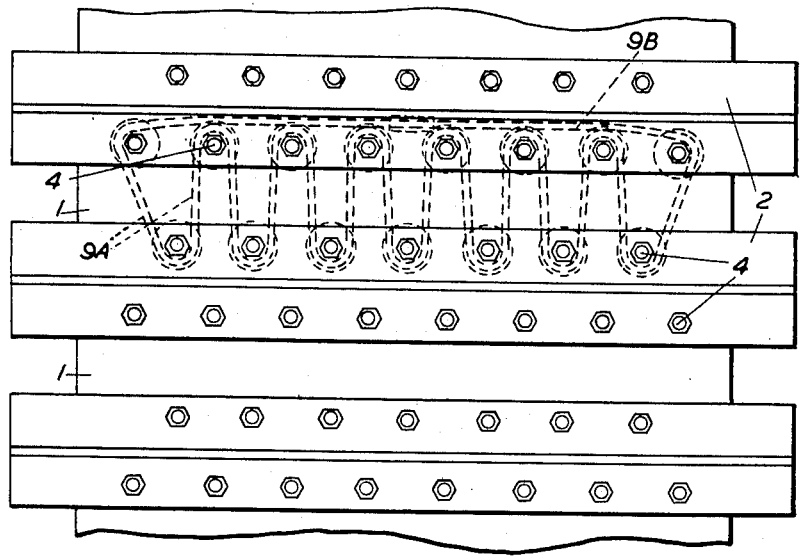
Figs. 21 and 22 are plan views of the outer and inner faces respectively of a track embodying units according to Fig. 19.
Figure 22:
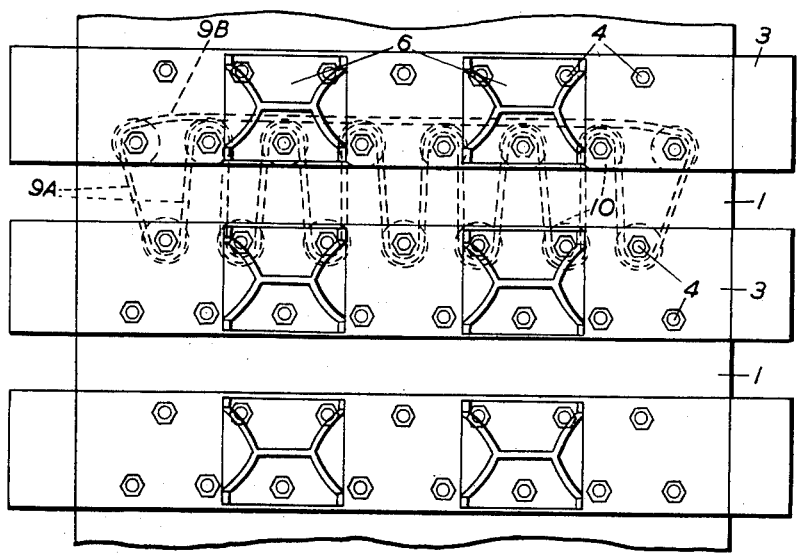

Referring to Fig. 23, two longitudinally spaced pairs of pulley wheel guides 15 and 16 are engaged in their grooves by an endless flexible cable 9 with its ends joined at 9C, the cable forming parallel flexible stretches 9A between the pairs of guides and forming transverse lengths 9B extending across substantially the entire unit width between the guides of each pair. Any increase in tension in one stretch 9A is distributed around the guides 15 and 16 and is transmitted directly across substantially the entire unit width, through the lengths 9B, to the other stretch 9A. As previously, the units are interconnected by passing the clamping bolts through the openings 13.

Figure 24:
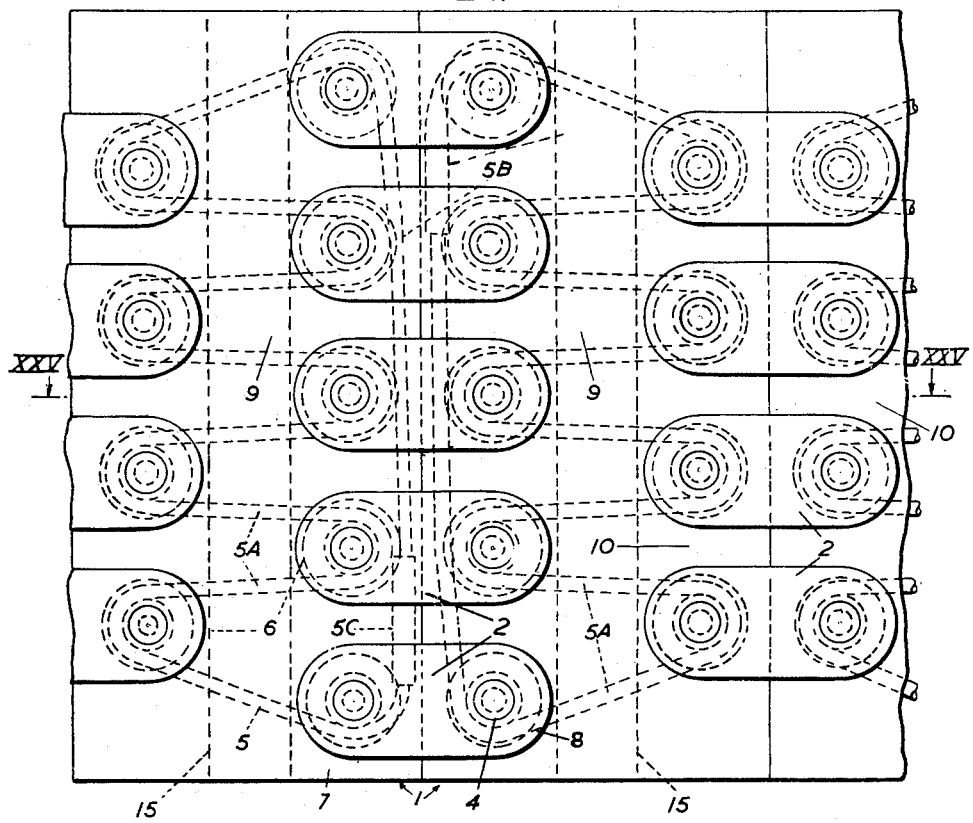
Fig. 24 is a fragmentary plan view of an endless band conveyor.
Figure 25:
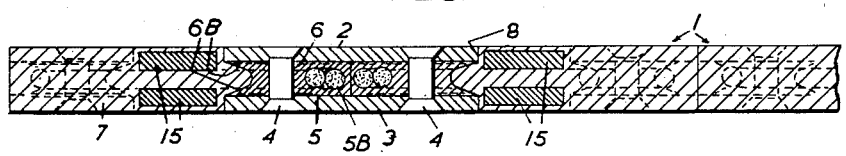
Fig. 25 is a sectional view on the line XXV—XXV of Fig. 24.
Figure 26:
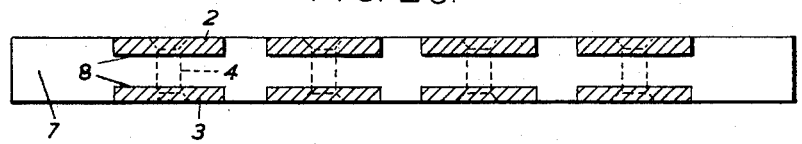
Fig. 26 is an end view of Fig. 24.

Referring to Figs. 24 to 26, the endless band of a conveyor consists of a series of flexible, abutting units 1 joined to each other by connection means in the form of transversely spaced pairs of top and bottom metal plates 17 and 18, and rivets 19 extending through adjacent units and interconnecting the pairs of plates 17 and 18.

Each band unit 1 consists of a multi-strand wire cable 9 looped sinuously, in a tranverse direction and lying substantially parallel to that plane of the unit which makes contact with the material to be conveyed, around series of pulley-wheel guides 10 disposed in two longitudinally spaced transverse series with the guides in each series staggered relative to those in the other series. The cable 9 thus passes sinuously around all the guides 10 and forms a transverse series of substantially co-planar loops whereof the limbs form transversely spaced flexible stretches 9A between the series of guides. The cable then extends transversely alongside one series of guides, as at 9B, and has its ends joined together at 9C, thereby forming an endless band extending across substantially the entire conveyor width, the transverse length 9B enabling transmission of tension directly across the conveyor. The guides 10 have openings therethrough which accommodate the shanks of the rivets 19 which with the plates 17, 18 interconnect a series of the units to form an endless conveyor band. The tension member is wholly and permanently enclosed in, and the guide means is permanently embedded in a block 14 of rubber or rubber like material for example by moulding, to form a flexible, rectangular unit. Reinforcing strips 20 of canvas or other semi-stiff material are embedded in the block and engage the top and bottom faces of the tension member. The top and bottom faces of the guides 10 may be free of rubber as shown. The plates 17, 18 are embedded in recesses 21 formed in the block 14 so as to lie flush with the block surface.

In use of the conveyor, longitudinal clearances 22 between successive transverse series of plates 17, 18 permit longitudinal flexing of the band, and transverse clearances 23 between the pairs of plates 17 and 18 of each transverse series permit lateral flexing, or cupping, of the band. Moreover, by virtue of the ready transmission of tension through the stretch 9B transversely of the conveyor, a relatively small tensile force at one side of the conveyor causes an extension of the conveyor at that side and corresponding contraction at the other side and bending of the conveyor in its own plane is thus possible in the event that material is to be conveyed round a corner. By embedding the metallic parts 9 and 10 in a unitary manner in rubber, there is formed a flexible belt unit which is easily handled and replaced and has its metallic parts protected from the weather.

Figure 27:
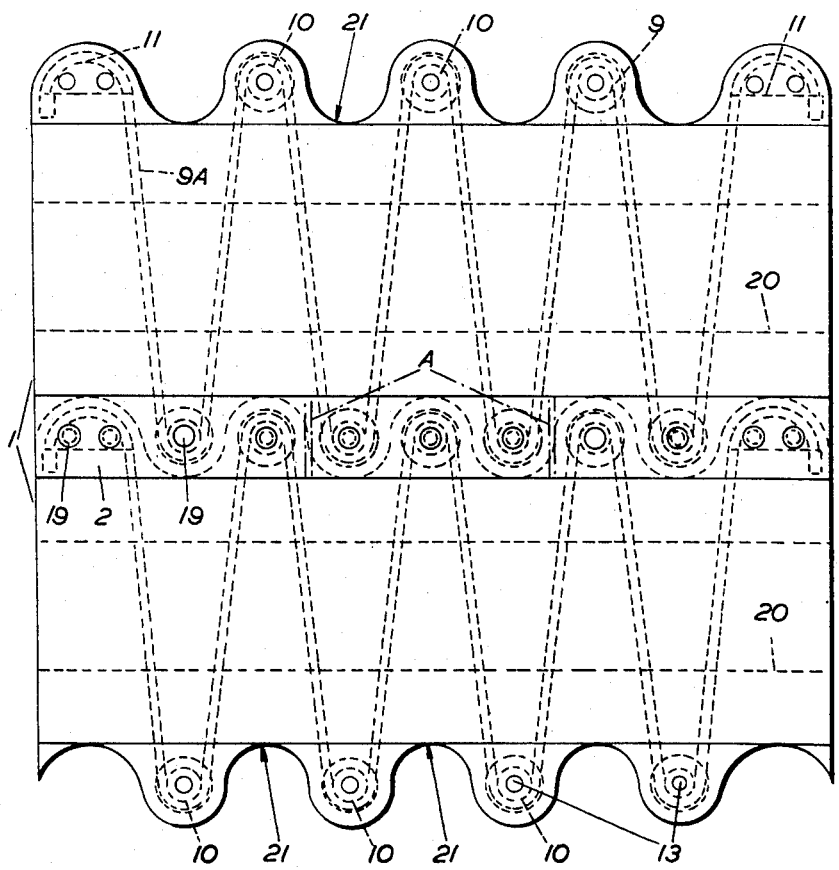
Fig. 27 is a fragmentary plan view of a conveyor with a second form of band unit.
Figure 28:
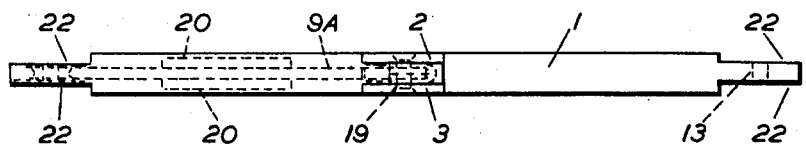
Fig. 28 is a side view of Fig. 27.

In Figs. 27 and 28 the conveyor is a modification of the track of Figs. 17 and 18. The cable 9 extends in a somewhat diagonal but generally longitudinal direction between each pulley wheel 10, and the rubber of the block 1 is moulded and vulcanized so as to present concavities 21 on the front and rear edges of the blocks between adjacent pulley wheels 10. The end pulley wheels 11 are in the form of fixed half-pulleys to which the ends of the cable 9 are secured. Reinforcing canvas strips 20 are provided in the block 1 above and below the cable 9. The pulley wheels 10 of adjacent blocks 1 are adapted to nest in these concavities 11, the concavities in one unit receiving the projecting pulley wheels of the other unit and vice versa. Transverse metal joining plates 2 and 3 are secured together by rivets 19 extending through the openings in the pulley wheels 10 and 11. In operation, longitudinal flexing of the band occurs at each unit between the rows of pulley wheels 10. By forming each plate 2 and 3 as a series of short plates spaced from each other, as indicated in dot-dash lines at A in Fig. 4, provision is made for lateral flexing or cupping of the band.

The metal cable 9 of each embodiment may be replaced, for example, by resilient metal strip or bar, or by nylon or other textile cables, or by any other suitable flexible members.

As will be evident, the construction of the pulley wheels shown in the drawings facilitates the transmission of any increase in tension in one stretch of the flexible tension member to another stretch or stretches.

I claim:

1. An endless band device comprising a series of flexible units each having two longitudinally spaced transversely extending rows of guide means and a flexible tension member extending in a transverse zig-zag path around the guide means from one row of guide means to the other to form a transverse series of substantially coplanar loops, the tension member being capable of deformation in the plane of the loops so as to be slidable around the guide means under uneven tension transversely of the device, and connection means interconnecting the guide means of adjacent units, whereby tension in the device is transmitted through said loops and an increase in tension in any one loop is distributed around the guide means to another loop.

2. An endless band device comprising a series of flexible moulded rubber pads each having embedded therein so as to be unitary therewith longitudinally spaced guide means and a flexible tension member looped around at least one of the guide means to form transversely spaced flexible stretches between the guide means, the tension member being capable of deformation in the plane of the loop so as to be slidable around the guide means under uneven tension transversely of the device, and connection means interconnecting the guide means of adjacent pads so that tension in the device is transmitted through said stretches and an increase in tension in any one stretch is distributed around the guide means to another stretch.

3. An endless band device according to claim 2, having a flexible supporting layer of semi-stiff material located under the flexible stretches of the tension member so that said stretches are maintained against angular bending on passage of the device around the sprocket.

4. An endless band device comprising a series of flexible moulded rubber units each having embedded therein so as to be unitary therewith two longitudinally spaced transverse rows of guides with openings therethrough, the guides of one row being staggered in relation to the guides of the other row, and a flexible tension member looped in a transverse zig-zag path around the guides from one row of guides to the other to form transversely spaced substantially coplanar straight stretches between the rows of guides, the tension member being capable of deformation in the plane of the stretches so as to be slidable around the guides under uneven tension transversely of the device, outer and inner plates between which are located the guides of adjacent units, and clamping bolts extending through the guide openings and interconnecting said plates, whereby tension in the device is transmitted through said stretches and an increase in tension in any one stretch is distributed around a guide to another stretch.

5. A flexible unit for an endless band device comprising a moulded rubber pad having embedded therein so as to be unitary therewith longitudinally spaced guide means adapted for connection to the guide means of adjacent units to form the endless band device, and a flexible tension member looped bodily around at least one of the guide means so that two longitudinally spaced stretches of the tension member form transversely spaced flexible stretches between the guide means, the tension member being capable of deformation in the plane of the loop so as to be slidable around the guide means under uneven tension transversely of the unit.

6. An endless band device comprising a series of flexible units, each unit having two longitudinally spaced transversely extending rows of pulley wheels, the pulley wheels in one row being staggered in relation to those in the other row and the axis of each pulley wheel being substantially normal to the plane of the band, and a flexible cable interconnecting the pulley wheels, the cable extending sinuously around the pulley wheels from one row of pulley wheels to the other to form a transverse series of loops lying substantially in a plane parallel to the band surface so that transversely spaced flexible stretches are formed between the pulley wheels, and the cable being wholly and permanently enclosed in, and the pulley wheels being permanently embedded in, rubber material to form the flexible unit, pairs of outer and inner connecting members for the units, each pair having located between them transverse rows of pulley wheels of a pair of adjacent units, and clamping means extending through openings in the pulley wheels and detachably interconnecting the connecting members.

7. An endless band device comprising a series of flexible units, each unit having two longitudinally spaced transversely extending rows of guides, the guides in one row being staggered relative to those in the other row, and a flexible tension member interconnecting the guides, the tension member extending sinuously around the guides from one row of guides to the other to form a transverse series of loops lying substantially in a plane parallel to the face of the band so that transversely spaced flexible stretches are formed between the guides, the tension member being capable of deformation in the plane of the loops so as to be slidable around the guides under uneven tension transversely of the device, the tension member being wholly and permanently enclosed in, and the guides being permanently embedded in, rubber material to form the flexible unit, each unit having concavities formed at its front and rear edges between adjacent guides so that the guides at the front edge of one unit nest in the concavities of the rear edge of an adjacent unit, pairs of outer and inner connecting members for the units, each pair having located between them transverse series of guides of a pair of adjacent units, and clamping means extending through openings in the guides and detachably interconnecting the connecting members.

8. An endless band device, comprising a series of flexible units, each unit having two longitudinally spaced transversely extending rows of guides, at least one row of guides being disposed across substantially the entire width of the unit and the guides in one row being staggered relative to those in the other row, and an endless flexible tension member interconnecting the guides, the tension member having one portion extending sinuously around the guides from one row of guides to the other to form a transverse series of loops lying substantially in a plane parallel to the ground when the unit is in contact with the ground so that transversely spaced flexible stretches are formed between the rows of guides, and having another portion extending alongside one row of guides across substantially the entire width of the unit, and the tension member being capable of deformation in the plane of the loops so as to be slidable around the guides under uneven tension transversely of the band and being wholly and permanently enclosed in, and the guides being permanently embedded in, rubber material to form the flexible unit, pairs of outer and inner connecting members for the units, and clamping means extending through openings in the guides and interconnecting the connecting members.

9. An endless band device comprising a series of flexible units, each unit having longitudinally spaced abutment means and a flexible tension member interconnecting the abutment means, at least one abutment means being disposed transversely across substantially the entire width of the unit and the tension member being looped slidably around said transversely disposed abutment means in a transverse direction so that transversely spaced longitudinal stretches are formed between the abutment means and a transverse stretch is formed across substantially the entire width of the unit and increase in tension in one longitudinal stretch is transmitted through the transverse stretch directly across substantially the entire width of the unit to another longitudinal stretch, and the tension member being in a unitary manner enclosed in, and the abutment means being in a unitary manner embedded in, rubber or rubberlike material to form the flexible unit, and connection means interconnecting the abutment means of adjacent flexible units.

10. An endless band device according to claim 9, wherein the abutment means of each unit consists of two longitudinally spaced series of abutments extending transversely across substantially the entire width of the unit, the abutments in each series being staggered relative to those in the other series, and wherein the tension member is endless, having one portion slidably looped in a transverse zig-zag path around the abutments from one series to the other to form the longitudinal stretches, and having another portion extending transversely alongside one series of abutments across substantially the entire width of the unit to form the transverse stretch which assists in transmitting tension directly from a longitudinal stretch at one side of the unit to a longitudinal stretch at the other side of the unit.

11. A flexible unit for an endless band device comprising longitudinally spaced abutment means and a flexible tension member interconnecting the abutment means, at least one abutment means being disposed transversely across substantially the entire width of the unit and the tension member being looped slidably around said transversely disposed abutment means in a transverse direction so that transversely spaced longitudinal stretches are formed between the abutment means and a transverse stretch is formed across substantially the entire width of the unit and increase in tension in one longitudinal stretch is transmitted through the transverse stretch directly across substantially the entire width of the unit to another longitudinal stretch, and the tension member being in a unitary manner enclosed in, and the abutment means being in a unitary manner embedded in, rubber or rubberlike material to form the flexible unit.

12. An endless band device according to claim 1, wherein the guide means and tension member of each unit are embedded in a unitary manner in flexible moulded rubber.

References Cited in the file of this patent

UNITED STATES PATENTS

| | | |
|---|---|---|
| 2,331,287 | Allen et al. | Oct. 12, 1943 |
| 2,338,550 | Sloman et al. | Jan. 4, 1944 |
| 2,351,647 | Wales | June 20, 1944 |
| 2,410,507 | Knight | Nov. 5, 1946 |

FOREIGN PATENTS

| | | |
|---|---|---|
| 471,916 | Germany | Feb. 19, 1929 |
| 170,900 | Switzerland | July 31, 1934 |
| 893,727 | France | Feb. 21, 1944 |